United States Patent [19]

Yamaguchi et al.

[11] 4,435,881

[45] Mar. 13, 1984

[54] HARNESS CLIP

[75] Inventors: Noboru Yamaguchi; Seiichi Satoh, both of Yokohama, Japan

[73] Assignee: Nissan Motor Co., Ltd., Yokohama, Japan

[21] Appl. No.: 324,108

[22] Filed: Nov. 23, 1981

[30] Foreign Application Priority Data

Nov. 28, 1980 [JP]  Japan .......................... 55-170639[U]

[51] Int. Cl.³ ............................................. B65D 63/10
[52] U.S. Cl. ................................................. 24/16 PB
[58] Field of Search ............. 24/16 PB, 17 AP, 17 A, 24/17 R, 30.5 P, 30.5 S; 248/74.5

[56] References Cited

U.S. PATENT DOCUMENTS

| | | | |
|---|---|---|---|
| 2,969,216 | 1/1961 | Hallsey | 24/16 PB X |
| 3,152,219 | 10/1964 | Murray et al. | 24/16 PB X |
| 3,550,219 | 12/1970 | Van Buren, Jr. | 248/74.5 X |
| 4,342,438 | 8/1982 | Speedie | 24/17 A X |

FOREIGN PATENT DOCUMENTS 2380456 10/1978 France ............................. 24/16 PB Primary Examiner—Robert P. Swiatek
Attorney, Agent, or Firm—Schwartz, Jeffery, Schwaab, Mack, Blumenthal & Koch

[57] ABSTRACT

A harness clip which comprises an engaging member having a penetrating hole, a leg portion integrally formed with one end of the engaging member and also formed with an engaging portion which is elastically deflecting, and a long strap integrally extended from the engaging member in a direction opposite to the leg portion and integrally formed with teeth for engaging a harness. The strap is engaged with the hole of a panel for mounting the harness integrally with the engaging portion of the leg portion and the teeth of the strap when the strap is inserted into the hole of the engaging member. Thus, the harness can be simply engaged exactly with a panel.

7 Claims, 4 Drawing Figures

HARNESS CLIP

BACKGROUND OF THE INVENTION

This invention relates to a clip for retaining a harness and, more particularly, to improvements in a harness clip for retaining a relatively long harness or the like in space.

There is heretofore known as means for retaining a long harness or the like a clip which incorporates a head portion and a leg portion for holding a harness or the like in the state of engaging the harness with the head portion.

The conventional clip of this type had to employ different sizes of the clip in accordance with the size or the diameter of the harness or the like, or to incorporate means for preventing the looseness of the head portion for engaging the harness or the like.

There is proposed a clip which accommodates a strap and a leg portion so as to eliminate the aforementioned drawbacks.

This clip should secure a harness or the like engaged by the strap by inserting the free end of the strap into a penetrating hole made in the leg portion of the clip. The strap is tightened by pulling same through the hole. The clip retains the harness or the like thus engaged by engaging the leg portion with a panel hole.

In these conventional clips, the leg is independently operated. When the leg of the clip is engaged within the hole of a panel, an engaging means is mounted at the hole of the panel independently. Further, the strap for engaging the harness or the like is also operated to tighten the harness with another means independently provided of the leg portion.

As described above, the conventional clip must incorporate separate leg engaging means, harness tightening means, harness holding means and so forth, and has accordingly drawbacks such as an increased number of steps when designing and molding the respective means or components.

SUMMARY OF THE INVENTION

Accordingly, a primary object of this invention is to provide a harness clip which eliminates all of the above-described disadvantages and drawbacks of the conventional clip and which can be exactly engaged with a panel with a relatively simple construction.

Another object of this invention is to provide a harness clip which is not obliquely engaged with a panel nor unstably engaged loosely by engaging the leg portion and the teeth of the strap integrally within the hole of the panel.

Yet another object of this invention is to provide a harness clip which is not disengaged from a panel, once engaged, due to vibration occurring thereat during use.

A further object of this invention is to provide a harness clip which can be freely adjusted in accordance with the size of the harness.

Still another object of this invention is to provide a harness clip which can also be used independently in the state for engaging the harness with the strap without being engaged within the hole of a panel.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

Figure 1:
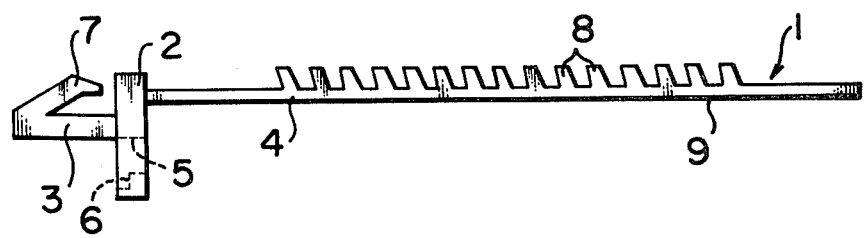
FIG. 1 is a front view showing a preferred embodiment of a harness clip constructed according to this invention.
Figure 2:
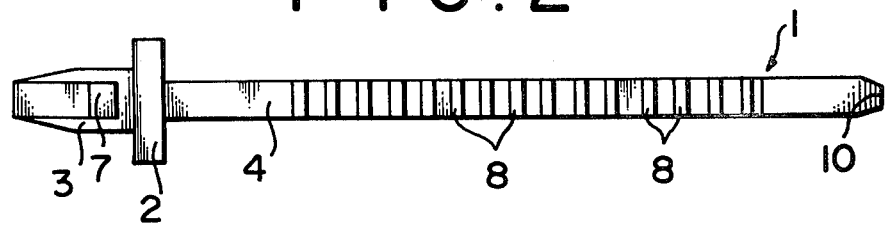
FIG. 2 is a plan view of the harness clip shown in FIG. 1.

Referring to the drawings, particularly to FIGS. 1 and 2 showing a preferred embodiment of a harness clip constructed according to this invention, wherein like reference numerals designate the same or equivalent parts and components in the following views, a harness clip, generally designated by reference numeral 1, is integrally molded with flexible synthetic resin.

The harness clip 1 is formed of an engaging member 2 at one end of which a leg portion 3 is integrally formed, and a long strap 4 integrally extended in a direction opposite to the leg portion 3.

In this embodiment, the engaging member 2 is formed in a disc shape and is also perforated with a penetrating hole 5 through which the strap 4 can pass at a position displaced in one direction from the center line thereof. A stepped recess portion 6 intruded into the engaging member 2 is formed at one end of the hole 5 of the engaging member 2.

Figure 3:
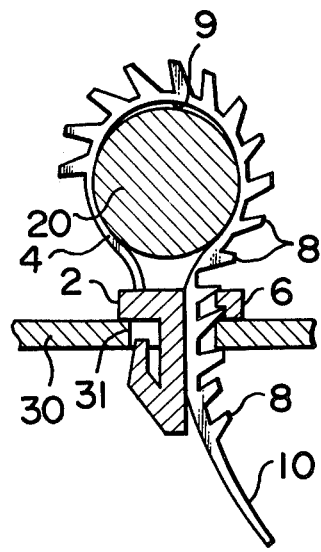
FIG. 3 is an explanatory view partly in cross section showing the harness clip of the invention in use.

The leg portion 3 is integrally extended from the one end of the engaging member 2. An engaging portion 7 extends from the free end of the said leg portion 3 and is outwardly bent toward said engaging member 2 to be elastically contacted when it is inserted into the hole of a panel. The engaging portion 7 is elastically expanded when it is disengaged from the hole of the panel as, for example when it is extended through the hole as shown in FIG. 3.

The strap 4 is formed of a long and thin plate and is integrally extended from the position displaced in one direction of the engaging member 2. The strap 4 is displaced on the other side of engaging member 2 from that of the leg portion 3. A plurality of teeth 8 are projected integrally from the one side surface thereof in the same direction as the engaging portion 7.

The teeth 8 are spaced from each other on the strap 4 and are inclined substantially at an equal angle with respect to the direction of the engaging member 2.

In this embodiment, the teeth 8 have a flat surface at the ends thereof, but may also be formed in an acute shape or any other shape.

The teeth 8 are not provided at both ends of the strap 4, and thus the strap 4 has a flat surface at both ends thereof on its front surface (teeth surface) and also on its back surface 9.

It is preferred to cut the end 10 of the strap 4 in tapered cutouts at both corners.

The operation of the harness clip thus constructed will be described in the case of fixedly engaging a harness of a predetermined outer diameter, but inclusive with other diameters.

FIG. 3 shows the harness clip thus formed in a partial cross section in case of engaging a harness with the strap.

A harness 20 having a predetermined diameter is engaged with the flat surface 9 of the strap 4 in such a manner that the teeth 8 are disposed outside thereof.

The harness 20 thus engaged is retained as it is. The end 10 of the strap 4 is inserted first into the hole 5 of the engaging member 2, and the strap 4 is pulled at the free end thereof through the hole 5 for tightly engaging the harness 20.

Inasmuch as the teeth 8 are disposed on the outer periphery of the strap 4 at this time, when they pass through the hole 5 of the engaging member 2, the teeth 8 are inclined upwardly and accordingly toward the engaging member 2.

Then, a part of each of the teeth 8 is engaged with the stepped recess portion 6 formed in the hole 5 of the engaging member 2, thereby stopping the movement of the strap 4 itself.

Accordingly, even in case that the harness clip engages the harness 20 of different various diameters, the harness clip 1 may readily engage the harness 20 by engaging the part of the teeth portions with the stepped recess portion 6 of the engaging member 2 upon pulling of the free end of the strap 4 through the hole 5 of the engaging member 2. The harness clip 1 thus can be used in a free state for any size harness.

For fixedly securing the harness clip 1 with a panel 30, it is merely necessary to form a hole 31 in the panel for engaging the engaging portion 7 and the strap 4 of the harness clip 1 via the teeth.

When engaging the harness clip 1 thus constructed with the hole 31 of the panel 30, it is only sufficient to insert the leg portion 3 of the clip 1 into the hole 31 of the panel 30 together with the end 10 of the strap 4.

The engaging portion 7 of the leg 3 is outwardly bent from the free end of the leg portion 3 toward said engaging member 2 to be elastically contracted when it is inserted into the hole of the panel and elastically expanded when it is disengaged from the hole of the panel. The engaging portion 7 is inwardly elastically contracted when it is inserted into the hole 31 of the panel 30, and the teeth 8 are simultaneously inserted through the hole 31 as inclined toward the panel 30 while being resisted by the hole 21 of the panel 30.

The panel 30 has a thickness such as to be engaged between the teeth 8 of the strap 4. The back surface of panel 30 contacts with the upper surface of a tooth 8 and is thus biased by the teeth 8 (which are inclined toward the upper surface thereof) for urging and supporting the panel.

Since the engaging portion 7 of the engaging member 2 and the teeth 8 of the strap 4 are inserted into the hole of the panel in this manner thereby forming an integral leg portion therewith, the harness can be readily and exactly mounted at the panel.

It should be understood from the foregoing description that since the harness clip of this invention is thus constructed to incorporate the engaging member formed, for example, of synthetic resin and with the penetrating hole with the stepped recess portion and the strap formed with the teeth thereon and the leg portion so that the leg portion and the teeth can be integrally inserted into and engaged with the hole of the panel, the harness clip is not inclined with respect to the panel, nor unstably engaged loosely with the panel, and is not disengaged from the panel due to vibration occurring during use thereof.

It should also be appreciated that since the harness clip of this invention is thus constructed, the clip can be freely adjusted in accordance with the size of the harness and can also be used independently in the state for engaging the harness with the strap without being engaged within the hole of a panel.

Figure 4:
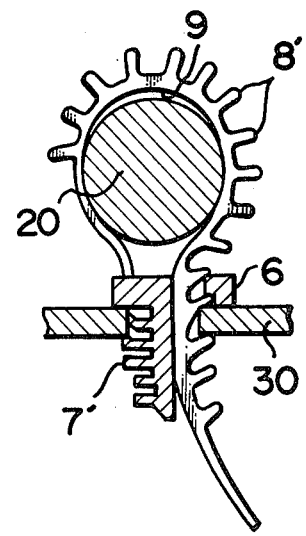
FIG. 4 is an explanatory view partly in cross section showing another preferred embodiment of the harness clip of the invention in use.

It is noted that the foregoing description is directed to the harness clip in which the engaging portion is formed integrally with the leg portion of the engaging member and the teeth are formed on the strap, the engaging portion may also be formed in parallel plates 7' as shown in FIG. 4 and the teeth may be formed with rounded ends as shown by teeth 8' so as to effect the same advantages and features as described above without the departure of the scope of the present invention.

What is claimed is:

1. A harness clip comprising:
   (a) an engaging member having a hole therethrough and a stepped portion within said hole,
   (b) a leg portion integrally connected to said engaging member and extending from one side of said engaging member, said leg portion having an engaging portion extending to one side of said leg portion,
   (c) a flexible strap integrally connected to said engaging member and extending from the other side of said engaging member, said strap having a plurality of teeth on one side thereof and being flat on the other side thereof,
   (d) said strap adapted to wrap around a harness for contacting said harness with said flat side of said strap and for subsequent passage through said hole of said engaging member, one of said plurality of teeth of said strap engaging said stepped portion of said engaging member for securing said harness to said engaging member,
   (e) said leg portion and said strap adapted to be extended within a hole of a panel for securing said clip thereto, said engaging portion of said leg portion flexibly bent by said panel and passing through said panel hole, said engaging member contacting one side of said panel upon insertion of said leg portion and said strap through said panel hole, and
   (f) said teeth of said strap positioned apart from one another such that one of said plurality of teeth resiliently contacts the other side of said panel upon contact of said engaging member with said one side of said panel for biasing said clip in secure engagement with said panel.

2. A harness clip as recited in claim 1 wherein said engaging member is disk-shaped.

3. A harness clip as recited in claim 2 wherein said engaging member hole is displacedly positioned from a center line thereof.

4. A harness clip as recited in claim 1 wherein said strap is tapered at its free end.

5. A harness clip as recited in claim 1 wherein said engaging portion of said leg portion comprises a plurality of parallel plates.

6. A harness clip as recited in claim 5 wherein the ends of said teeth are rounded.

7. A harness clip as recited in claim 1 wherein the ends of said teeth are rounded.

* * * * *

UNITED STATES PATENT AND TRADEMARK OFFICE
CERTIFICATE OF CORRECTION

PATENT NO. : 4,435,881

DATED : March 13, 1984

INVENTOR(S) : Noboru YAMAGUCHI and Seiichi SATOH

It is certified that error appears in the above-identified patent and that said Letters Patent is hereby corrected as shown below:

On the cover page, column 1, item 73 (Assignee) should read --Nissan Motor Co., Ltd., Yokohama, Japan, and Kato Hatsujo Kaisha, Ltd., Yokohama, Japan--

Signed and Sealed this

Twenty-fifth Day of September 1984

[SEAL]

Attest:

GERALD J. MOSSINGHOFF

*Attesting Officer*    *Commissioner of Patents and Trademarks*